United States Patent
Booker

(10) Patent No.: US 8,627,850 B1
(45) Date of Patent: Jan. 14, 2014

(54) MULTI-FEATURE DIGITAL SHOWER SYSTEM

(76) Inventor: Eddie Booker, Montgomery, AL (US)

(*) Notice: Subject to any disclaimer, the term of this patent is extended or adjusted under 35 U.S.C. 154(b) by 92 days.

(21) Appl. No.: 13/445,311

(22) Filed: Apr. 12, 2012

(51) Int. Cl.
- F17D 3/01 (2006.01)
- A47K 3/28 (2006.01)
- F17D 3/18 (2006.01)
- F16K 11/10 (2006.01)

(52) U.S. Cl.
USPC .............. 137/624.11; 137/801; 4/559; 4/597; 4/605

(58) Field of Classification Search
USPC .......... 137/624.11, 801, 606; 4/597, 605, 559
See application file for complete search history.

(56) References Cited

U.S. PATENT DOCUMENTS

| | | | |
|---|---|---|---|
| D262,905 S | 2/1982 | Tommaso | |
| 4,696,428 A | 9/1987 | Shakalis | |
| 5,371,491 A * | 12/1994 | Wu | 340/632 |
| 6,438,770 B1 | 8/2002 | Hed et al. | |
| 6,823,536 B2 | 11/2004 | Yip | |
| 7,124,452 B1 | 10/2006 | Bauza | |
| 2009/0095220 A1 | 4/2009 | Meinhold et al. | |
| 2010/0213279 A1 | 8/2010 | Frederick | |
| 2011/0186154 A1 * | 8/2011 | Klicpera | 137/551 |

OTHER PUBLICATIONS

WWW.SHOWERSMARTFAUCET.COM; Shower Smart Faucet; internet; as of Feb. 2, 2012.
WWW.GROHE.COM; Ondus; internet; as of Feb. 2, 2012.

* cited by examiner

Primary Examiner — Craig Schneider
Assistant Examiner — Atif Chaudry

(57) ABSTRACT

An electronic shower system comprises in major part a console and plumbing assembly and effective for reducing water use and cost by enabling the storage and use of preset shower settings, the shower console configured to adjust the flow of hot and cold water from hot and cold water lines fluidly attached to a shower faucet via the use of motors and water valves and where the console can further comprise such additional features as a radio unit.

5 Claims, 6 Drawing Sheets

(ISO View)

(In-use View)

(Top View)

(Detail View)

(Detail View)

(Block Diagram)

MULTI-FEATURE DIGITAL SHOWER SYSTEM

BACKGROUND OF THE INVENTION

The present invention relates to sophisticated shower systems or electronic shower management devices. Specifically, the present invention relates to a digital, multi-feature shower system for adjusting temperature in a shower where the console can also utilize a radio unit, and the console can comprise other novel features and save settings for the console unique to a user.

People are constantly trying optimize their time, especially when showering and getting ready in the morning. Inevitably, different people prefer different temperatures for their water when they are showering.

It is believed that there is a need for an easy-to-use system of generating pre-set settings for the temperature of water in a shower. Such a system can cut costs, save water and be more energy efficient.

SUMMARY

The present invention features a digital multi-feature shower system. In some embodiments, the present invention comprises a console, a plumbing assembly comprising hot and cold water lines, hot and cold water input valves and hot and cold motors coupled to the hot and cold water input valves and a mixing chamber, a shower faucet, a console, a microprocessor, a storage medium, a radio unit, a display, a plurality of controls, and a border ring forming a border around the face of the console.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
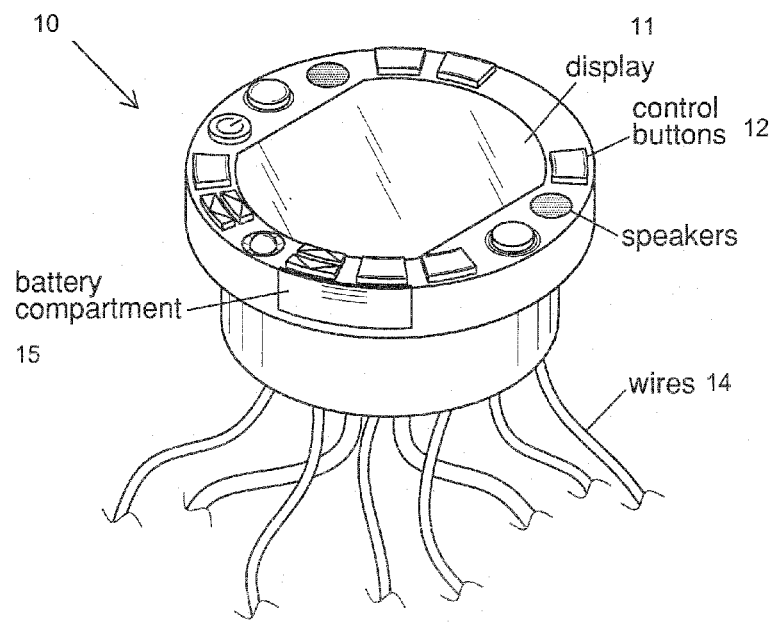
FIG. 1 is an iso view of the present invention.
Figure 2:
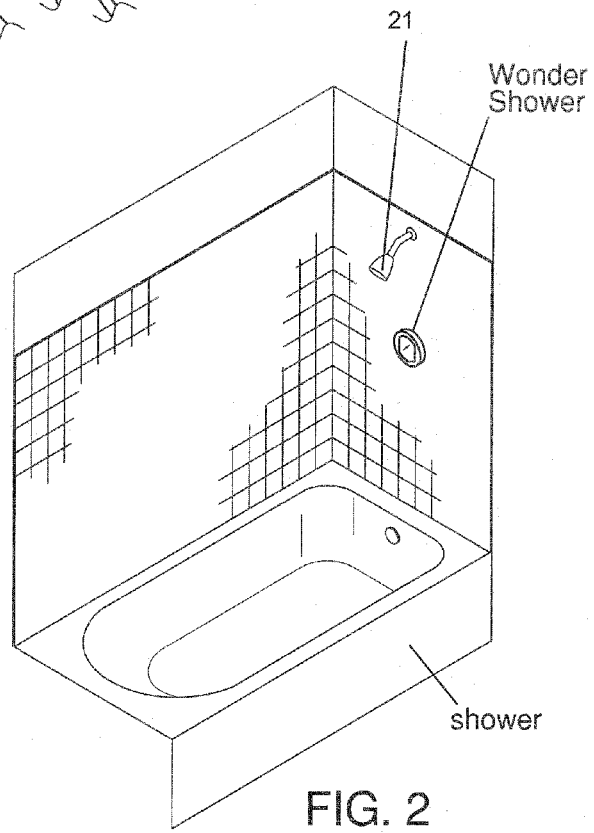
FIG. 2 is an in-use view of the present invention.
Figure 3:
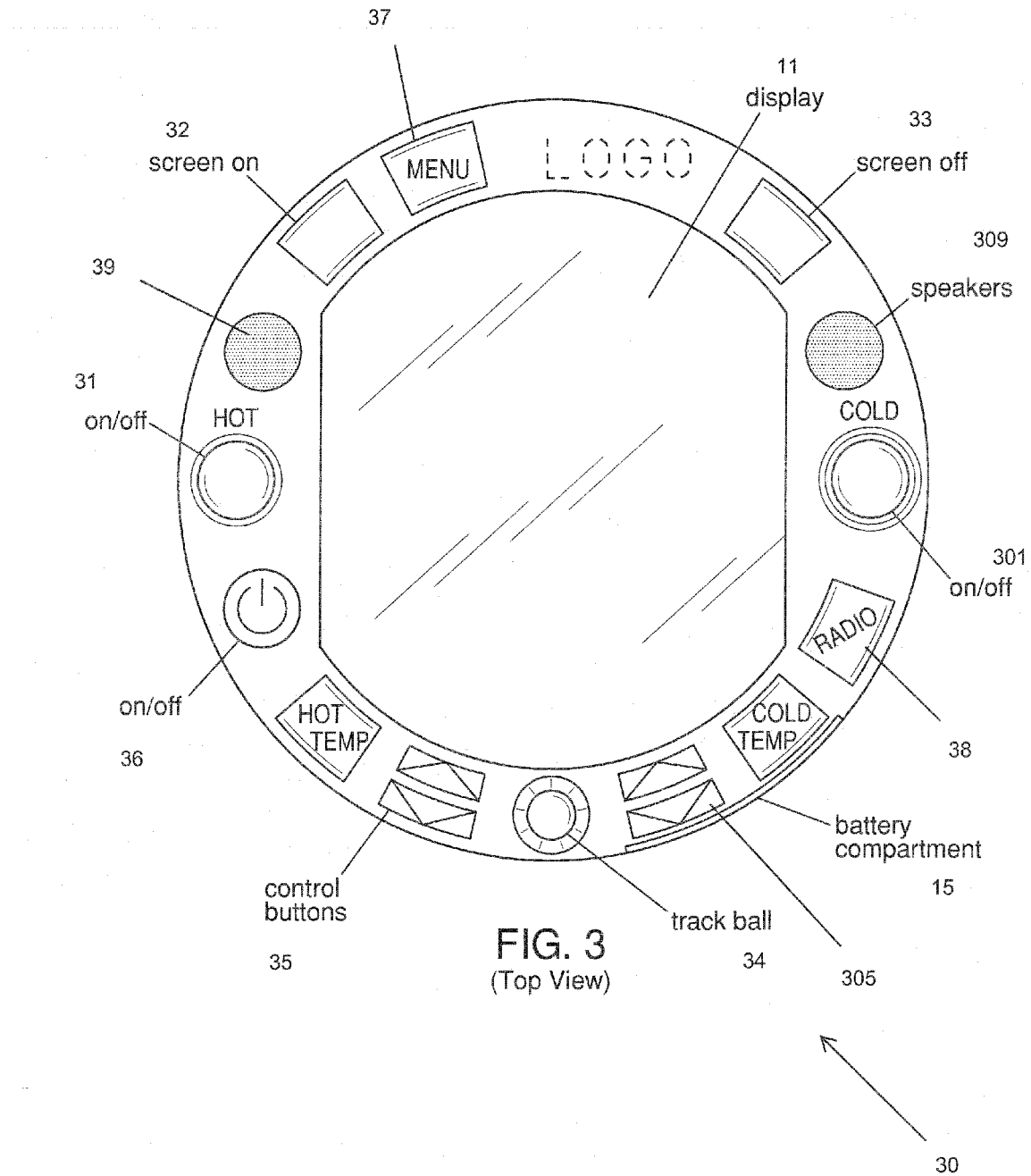
FIG. 3 is a top view of the present invention.
Figure 4:
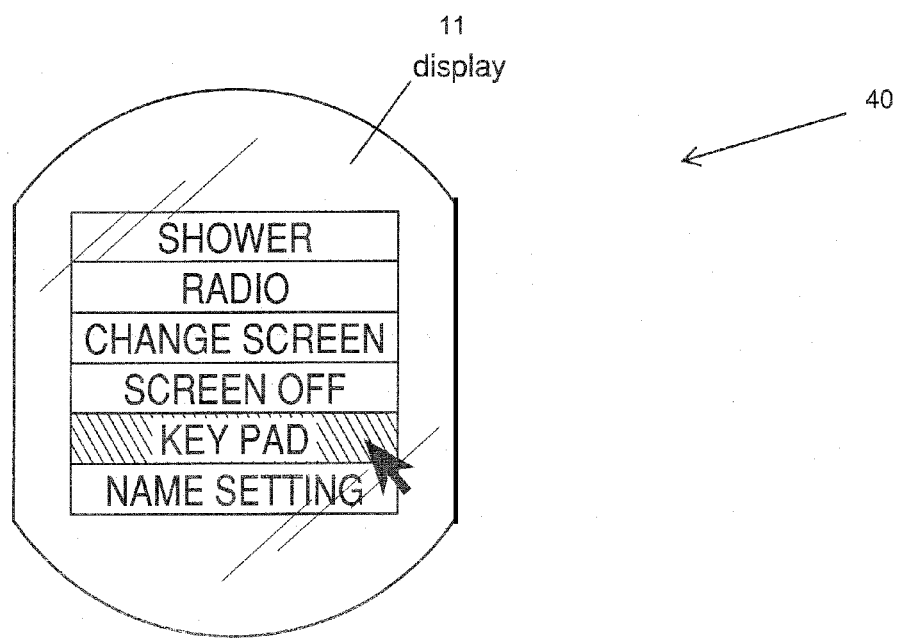
FIG. 4 is a detail view of the menu of the present invention.
Figure 5:
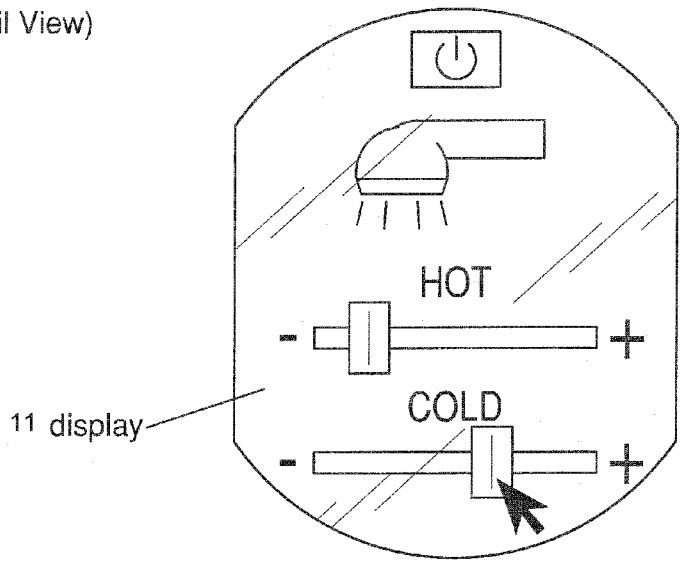
FIG. 5 is a block diagram view of the present invention.
Figure 6:
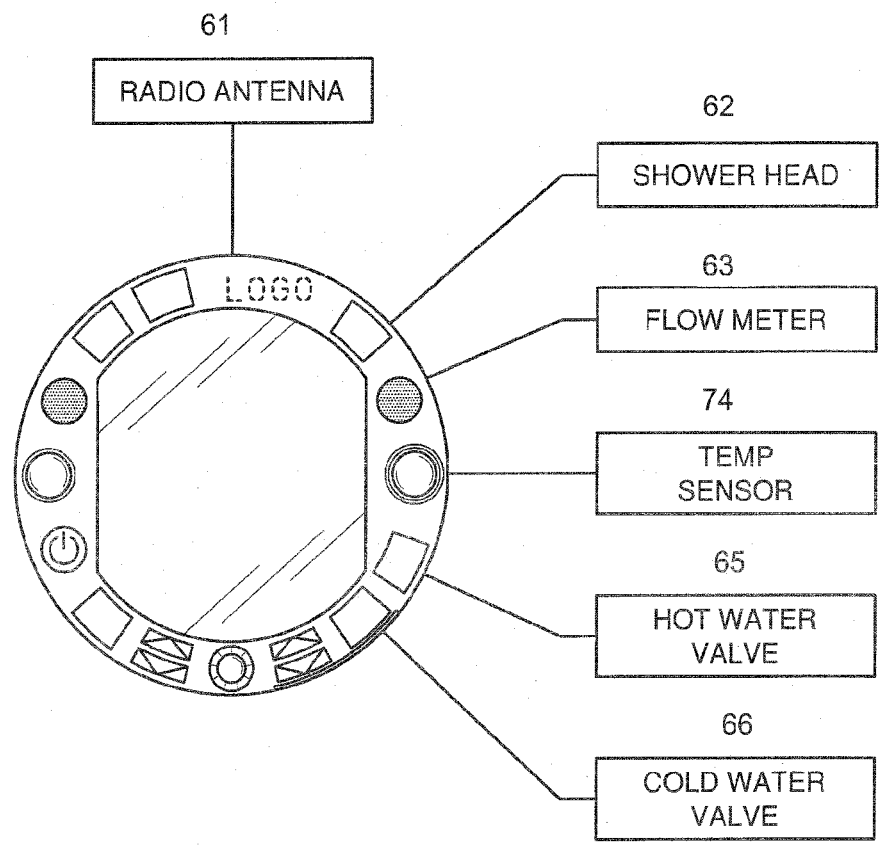
FIG. 6 is a block diagram view of the present invention.
Figure 7:
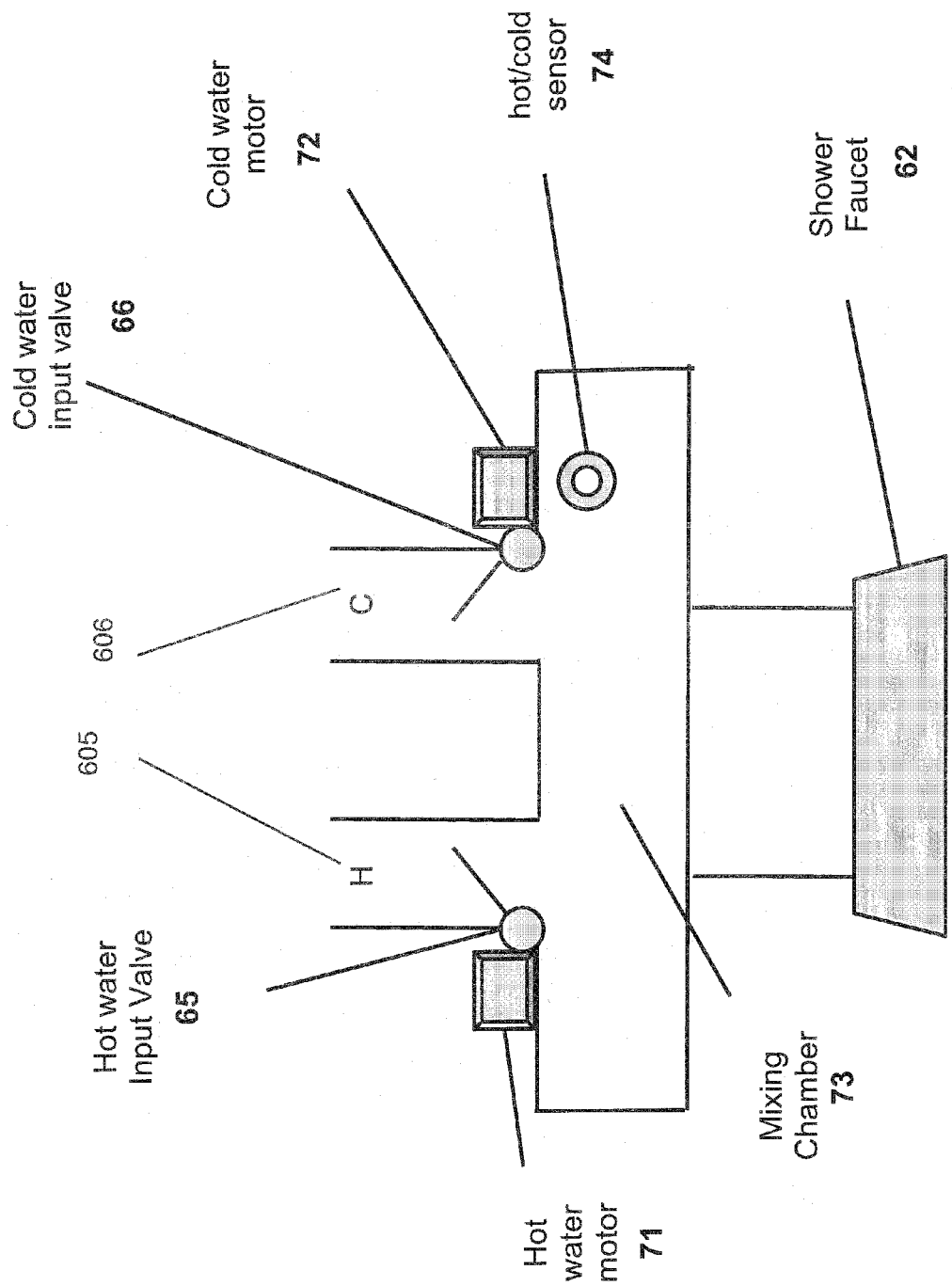
FIG. 7 is a hardware diagram view of the plumbing components of the present invention.
Figure 8:
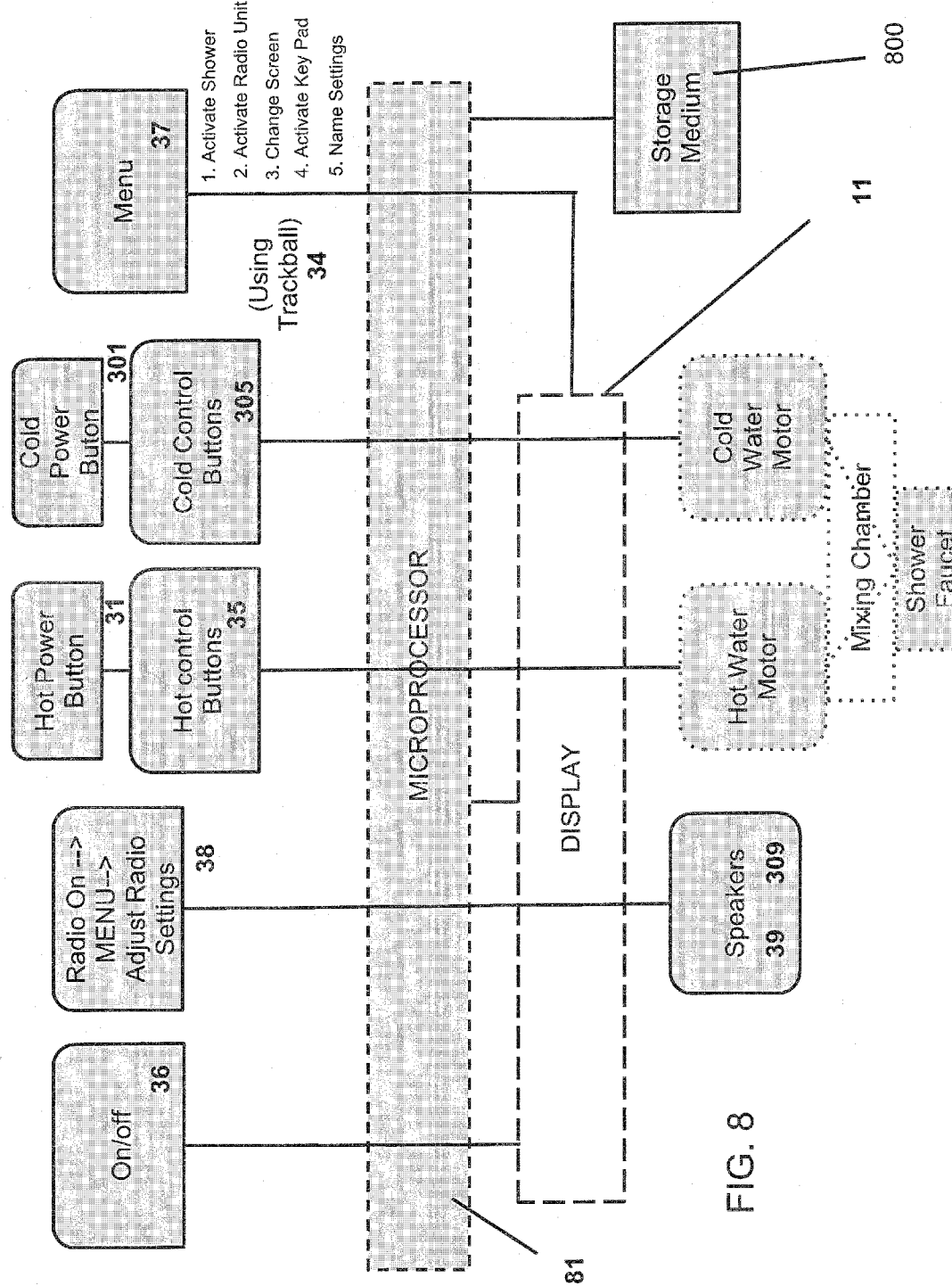
FIG. 8 is a systems diagram of the electrical components of the present invention.

Referring now to FIG. 1-8, the present invention, in some broad embodiments, features an electronic shower system effective for reducing water use and cost by enabling the storage and use of preset shower settings.

In some embodiments, the console features a microprocessor [81], embedded within the console and in electronic communication with a power source [15], the microprocessor configured to process commands received from a plurality of controls, store and retrieve records corresponding to specific console settings, and transmit commands that enable the console to activate a series of functions of the console and enable the console to cause a shower faucet [21] to emit a specific temperature of water.

In some embodiments, the console features a cold water line fluidly connected to a cold water input valve [66], the valve coupled to a cold water motor [72] where the cold water motor [72] is configured to open and close the cold water valve [66], a hot water line fluidly connected to a hot water input valve [65], the valve coupled to a hot water motor [71], where the hot water motor [71] is configured to open and close the hot water valve [65], and a mixing chamber [73] with a hot/cold sensor [74], the mixing chamber fluidly connected to the cold water input valve [66] and the hot water input valve [65] and said mixing chamber [73] adapted to receive the flow of water from the cold [66] and hot [65] water input valves, the motors in electronic communication with the microprocessor [81], the hold/cold sensor [74] in electronic communication with the microprocessor [81] and configured to transmit information to the microprocessor [81] corresponding to the temperature of the water in the mixing chamber [73] and the degree of opening for the cold water [66] and hot water [65] valves corresponding to the said temperature.

In some embodiments, the console features a display [11] located at a centermost portion of a face of the console and in electronic communication with the microprocessor, the display [11] comprising a visual portion surrounded by a border ring, the display [11] further comprising a menu interface [40] which is displayed at the display [11] when a menu button [37] disposed on the border ring is toggled, the menu interface [40] comprising code for displaying a plurality of options to the user where the user interacts with the menu interface [40] by way of a track ball [34].

In some embodiments, the console features a digital storage medium [800] embedded within the console and in electronic communication with the microprocessor, the storage medium effective for storing information about the user's preferences with respect to the degree of opening of the hot and cold water valves, where said preferences have been inputted by the user via the menu interface [40].

In some embodiments, the console features an radio unit [38], disposed at the border ring and operatively connected to the microprocessor and the power source [15], the radio unit controlled by the menu interface [40] and displayed on the display [11], the radio unit [38] comprising an on and off button [38] disposed on the face of the console, a first speaker [39] disposed on a first side of the face of the console and a second speaker [309] disposed on a second side of the face of the console, and a radio antennae [61].

In some embodiments, the console features the display on switch [32], disposed at the border ring, wherein the display on switch [32], when actuated, is configured to send a first signal to the microprocessor whereupon receiving the first signal, the microprocessor is configured to power on the display [11] and display the menu interface [40] to the user.

In some embodiments, the console features the display off switch [33], disposed at the border ring, wherein the display off switch [33], when actuated, is configured to send a first signal to the microprocessor whereupon receiving the first signal, the microprocessor is configured to power off the display [11].

In some embodiments, the console features a hot power button [31] disposed on the border ring, where the hot power button, when actuated, is configured to transmit a first signal to the microprocessor [81], whereupon receiving said first signal, the microprocessor [81] sends a second signal to the hot water motor [71] to activate the input of hot water by opening the hot water valve [65].

In some embodiments, the console features a cold power button [301] disposed on the border ring, where the cold power button, when actuated, is configured to transmit a first signal to the microprocessor [81], whereupon receiving said first signal, the microprocessor [81] sends a second signal to the cold water motor [72] to activate the input of cold water by opening the cold water valve [66].

In some embodiments, the console features a set of hot water control buttons [35], disposed on the border ring, the buttons comprising an increase hot button and a decrease hot button, said hot water control buttons capable of adjusting the input of hot water controlled by the console whereupon the user toggling the increase hot button or the decrease hot button, a first signal is transmitted to the microprocessor [81] whereby the microprocessor receives said first signal and sends a second signal to the hot water motor [71] which instructs the hot water motor [71] to open or close the hot water valve [65] to a certain degree corresponding to information received by the microprocessor [81], thereby adjusting the flow of hot water.

In some embodiments, the console features a set of cold water control buttons [305], disposed on the border ring, the buttons comprising an increase cold button and a decrease cold button, said cold water control buttons capable of adjusting the input of cold water as controlled by the console whereupon the user toggling the increase cold button or the decrease cold button, a first signal is transmitted to the microprocessor [81] whereby the microprocessor [81] receives said first signal and sends a second signal to the cold water motor [72] which instructs the cold water motor [72] to open or close the cold water valve [66] to a certain degree corresponding to information received by the microprocessor [81], thereby adjusting the flow of cold water.

In some embodiments, the console is activated by the user when the user actuates the on switch [32], wherein the user can adjust the temperature of water controlled by the console by manipulating the hot water control buttons [35] and the cold water control buttons [305] and thereafter, using the menu interface [40], the user can store a digital record on the storage medium where the record is associated with the user's name and corresponds to a desired water temperature setting.

In some embodiments, the console comprise a circular shape, bordered by a ridged border ring. The various control buttons can be disposed on the border ring. In such embodiments, inside the border ring, surrounded by the border ring, is the display. The various controls and buttons allow a user to interact with the menu interface which is presented by the display.

The console, in some embodiments, can be mounted on a wall or can be freestanding. The console can be in close proximity to the plumbing assembly so long as to enable electrical wiring or other electronic communication between the microprocessor of the console and the hot and cold water motors.

The display, in some embodiments, can comprise black and white or a color display, can be an LED screen, a digital screen, or any similar type of display as would be understood by one skilled in the art.

In some embodiments, the motors of the plumbing assembly further comprise wireless network controllers, and the microprocessor further comprise a wireless network controller, where the controllers of the motors are in electronic communication with the controllers of the microprocessor. As such, no wiring would be required between the console and plumbing assembly.

In some embodiments, the user can interact with the menu interface by touching the display and as such, the display can be a touch-screen display.

In some embodiments, the track ball functions only to change the color of the display and the user accesses the menu interface through a touch screen component of the display.

In some embodiments, when the user powers on the display, the words, "Wonder Shower" are displayed on the display.

In some embodiments, the mixing chamber, which is fluidly connected to the shower faucet, further comprises a flow valve coupled to a flow motor, where the flow valve is disposed at the connection between the mixing chamber and shower faucet. The flow motor can be in electronic communication with the microprocessor and can be configured to open or close the flow valve to increase or decrease the flow of water from the mixing chamber into the shower faucet.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electronic shower system effective for reducing water use and cost by enabling the storage and use of preset shower settings, the system comprising:

a. a microprocessor [81], embedded within a console and in electronic communication with a power source [15], the microprocessor configured to process commands received from a plurality of controls, store and retrieve records corresponding to specific console settings, and transmit commands that enable the console to activate a series of functions of the console and enable the console to cause a shower faucet [21] to emit, a specific temperature of water;

b. a plumbing assembly comprising a cold water line [606] fluidly connected to a cold water input valve [66], the valve coupled to a cold water motor [72] where the cold water motor [72] is configured to open and close the cold water valve [66], a hot water line [605] fluidly connected to a hot water input valve [65], the valve coupled to a hot water motor [71], where the hot water motor [71] is configured to open and close the hot water valve [65], and a mixing chamber [73] with a hot/cold sensor [74], the mixing chamber fluidly connected to the cold water line [606] and hot water line [605] and said mixing chamber [73] adapted to receive the flow of water from the cold water line [606] and hot water line [605], the motors in electronic communication with the microprocessor [81], the hold/cold sensor [74] in electronic communication with the microprocessor [81] and configured to transmit information to the microprocessor [81] corresponding to the temperature of the water in the mixing chamber [73] and the degree of opening for the cold water [66] and hot water [65] valves corresponding to the said temperature;

c. a display [11] located at a centermost portion of a face of the console and in electronic communication with the microprocessor, the display [11] comprising a visual portion surrounded by a border ring, the display [11] further comprising a menu interface [40] which is displayed at the display [11] when a menu button [37] disposed on the border ring is toggled, the menu interface [40] comprising code for displaying a plurality of options to the user where the user interacts with the menu interface [40] by way of a track ball [34];

d. a digital storage medium [800] embedded within the console and in electronic communication with the microprocessor, the storage medium effective for storing information about the user's preferences with respect to the degree of opening of the hot and cold water valves, where said preferences have been inputted by the user via the menu interface [40];

e. an radio unit [38], disposed at the border ring and operatively connected to the microprocessor and the power source [15], the radio unit controlled by the menu interface [40] and displayed on the display [11], the radio unit [38] comprising an on and off button [38] disposed on the face of the console, a first speaker [39] disposed on a first side of the face of the console and a second speaker [309] disposed on a second side of the face of the console, and a radio antennae [61];

f. the display on switch [32], disposed at the border ring, wherein the display on switch [32], when actuated, is configured to send a first signal to the microprocessor whereupon receiving the first signal, the microprocessor is configured to power on the display [11] and display the menu interface [40] to the user;

g. the display off switch [33], disposed at the border ring, wherein the display off switch [33], when actuated, is configured to send a first signal to the microprocessor whereupon receiving the first signal, the microprocessor is configured to power off the display [11];

h. a hot power button [31] disposed on the border ring, where the hot power button, when actuated, is configured to transmit a first signal to the microprocessor [81], whereupon receiving said first signal, the microprocessor [81] sends a second signal to the hot water motor [71] to activate the input of hot water by opening the hot water valve [65];

i. a cold power button [301] disposed on the border ring, where the cold power button, when actuated, is configured to transmit a first signal to the microprocessor [81], whereupon receiving said first signal, the microprocessor [81] sends a second signal to the cold water motor [72] to activate the input of cold water by opening the cold water valve [66];

j. a set of hot water control buttons [35], disposed on the border ring, the buttons comprising an increase hot button and a decrease hot button, said hot water control buttons capable of adjusting the input of hot water controlled by the console whereupon the user toggling the increase hot button or the decrease hot button, a first signal is transmitted to the microprocessor [81] whereby the microprocessor receives said first signal and sends a second signal to the hot water motor [71] which instructs the hot water motor [71] to open or close the hot water valve [65] to a certain degree corresponding to information received by the microprocessor [81], thereby adjusting the flow of hot water;

k. a set of cold water control buttons [305], disposed on the border ring, the buttons comprising an increase cold button and a decrease cold button, said cold water control buttons capable of adjusting the input of cold water as controlled by the console whereupon the user toggling the increase cold button or the decrease cold button, a first signal is transmitted to the microprocessor [81] whereby the microprocessor [81] receives said first signal and sends a second signal to the cold water motor [72] which instructs the cold water motor [72] to open or close the cold water valve [66] to a certain degree corresponding to information received by the microprocessor [81], thereby adjusting the flow of cold water;

wherein the console is activated by the user when the user actuates the on switch [32], wherein the user can adjust the temperature of water controlled by the console by manipulating the hot water control buttons [35] and the cold water control buttons [305] and thereafter, using the menu interface [40], the user can store a digital record on the storage medium where the record is associated with the user's name and corresponds to a desired water temperature setting.

2. The system of claim 1, where plurality of options at the menu interface comprises a shower power option which turns the water flow on and off, a radio activation option which activates the radio unit, a screen change option which allows the user to change the color of the display, a power off option for powering off the console, a key pad option which causes the display to display a key pad for entering a name, or a name setting option which allows the user to bring up console settings corresponding to the record stored about the particular user.

3. The system of claim 1, wherein the track ball is configured to change the display to yellow, amber, or blue.

4. The system of claim 1, wherein a label is disposed at an upper portion of the face of the console, the label reading "Wonder Shower".

5. The system of claim 1, wherein the console further comprises a control button for adjusting the flow of water in the shower.

\* \* \* \* \*